United States Patent
Inga

(10) Patent No.: US 6,363,300 B1
(45) Date of Patent: Mar. 26, 2002

(54) PROCESS AND SYSTEM FOR THE AUTOMATIC DETERMINATION OF AN OPTIMAL MOVEMENT PROGRAM OF A ROBOT

(75) Inventor: Marco-Severo Inga, Turin (IT)

(73) Assignee: Comau S.p.A., Turin (IT)

( * ) Notice: Subject to any disclaimer, the term of this patent is extended or adjusted under 35 U.S.C. 154(b) by 0 days.

(21) Appl. No.: 09/536,150

(22) Filed: Mar. 28, 2000

(30) Foreign Application Priority Data

Jul. 30, 1999 (IT) ........................................ TO99A0674

(51) Int. Cl.⁷ ............................................. G06F 19/00
(52) U.S. Cl. ....................... 700/245; 700/247; 700/248; 700/251; 700/252; 700/254; 700/255; 700/259; 318/568.11; 318/568.12; 318/568.13; 318/568.14; 318/568.16; 318/568.21; 901/2; 901/3; 901/4; 901/5; 901/6; 29/407.34; 219/121.34
(58) Field of Search ................................. 700/245, 255, 700/218, 248, 254, 247, 251, 252, 259; 318/568.11, 568.14, 568.1, 568.13, 568.12, 568.16, 568.21, 587; 701/301, 23; 901/2–6; 29/407.04; 219/121.34, 121.78; 414/730, 744.5–744.6

(56) References Cited

U.S. PATENT DOCUMENTS

| | | |
|---|---|---|
| 3,665,493 A | 5/1972 | Glowzewshi et al. |
| 3,746,955 A | 7/1973 | Kobayashi |
| 4,360,886 A * | 11/1982 | Kostas et al. ................ 700/264 |
| 4,587,469 A | 5/1986 | Ikebe et al. |
| 4,666,352 A | 5/1987 | Nagao et al. |
| 5,224,032 A | 6/1993 | Worn et al. |
| 5,798,627 A * | 8/1998 | Gilliland et al. ........ 318/568.14 |
| 5,906,761 A * | 5/1999 | Gilliland et al. ........ 219/124.34 |
| 6,249,718 B1 * | 6/2001 | Gilliland et al. ............ 700/255 |

OTHER PUBLICATIONS

He et al., Moving–object recognition using premarking and active vision, 1996, IEEE, pp.1980–1985 vol. 3.*

* cited by examiner

Primary Examiner—William A. Cuchlinski
Assistant Examiner—McDieunel Marc
(74) Attorney, Agent, or Firm—Sughrue Mion, PLLC

(57) ABSTRACT

Process for the automatic determination of an optimal movement program of a robot comprising at least one moving member, a motor associated with the moving member and a control unit capable of activating the motor according to a movement program to move the moving member along a trajectory with a predetermined movement parameter. The process comprises the steps of: acquiring data indicating the load state of the motor and the precision of movement of the robot during the execution of a movement program, comparing the information on the load state and on the precision of movement with predetermined limit values, repeatedly executing the movement program while progressively varying the movement parameter until a measured value of the load state and/or of the precision of movement exceeds a corresponding limit value, and storing as the optimal movement program the last movement program which has been executed without exceeding the limit values.

2 Claims, 2 Drawing Sheets

PROCESS AND SYSTEM FOR THE AUTOMATIC DETERMINATION OF AN OPTIMAL MOVEMENT PROGRAM OF A ROBOT

BACKGROUND OF THE INVENTION

The present invention relates to a process and system for the automatic determination of an optimal movement program of a robot.

Robots are frequently used to carry out repetitive work in which the most important requirement of the user is that the execution time of the work be kept to a minimum. To decrease the cycle time, the robot must execute movements from point to point as quickly as possible. At the present time, the speed of execution of the movements depends on certain system parameters which the user cannot modify. The parameters which have the greatest effect on the cycle time are the acceleration and the programmed maximum speed, and generally the user can use only a percentage of these parameters and cannot exceed maximum limits set by the manufacturer. The limits are conservative with respect to critical conditions, and could be exceeded in many cases, thus producing a considerable improvement in the cycle time.

SUMMARY OF THE INVENTION

The object of the present invention is to provide a process which enables a robot to determine automatically which is the optimal movement program which makes it possible to set locally (in other words, for each individual movement) a movement parameter for example, acceleration Or velocity - which enables the available torque of the driving motors to be used optimally.

BRIEF DESCRIPTION OF THE DRAWING

According to the present invention, this object is achieved by a process and a system having the characteristics which are the subject of the claims.

The present invention will now be described in detail with reference to the attached drawings, provided purely by way of example and without restriction, in which:

With reference to FIG. 1, the number 10 indicates schematically a programmable numerical control unit, associated with a robot 12. The numerical control unit 10 comprises a unit 14, called the autotuning supervisor, which is programmed to execute automatically a self-learning procedure which enables a movement program of the robot 12 to be optimized in an automatic way. The autotuning supervisor 14 sends control information to a movement program unit 16 in which, at the end of the self-learning procedure, the optimized control program of the robot 12 is stored. The autotuning supervisor 14 receives information from a unit 18 called the system monitor, which continually measures the torque of the driving motors of the robot 12 and the precision of movement of the robot 12. The autotuning supervisor 14 contains a strategy unit 20 in which the execution strategy of the autotuning supervisor is stored, and a parameter modification unit 22 containing parameters modifiable by a user 24 by means of an interface of an ordinary type. The user 24 enters information relating to the desired precision of movement of the robot 12 into the unit 22 of the autotuning supervisor 14. The precision of movement can be expressed, for example, as the maximum distance between the actual trajectory followed by an operating head of the robot 12 and a desired ideal trajectory.

Having specified the precision constraints to be observed, the user activates the autotuning procedure. The system consisting of the numerical control unit 10 and the robot 12 automatically writes a movement program which minimizes the execution time while complying with the constraints set by the user. The operating principle of the autotuning procedure consists in the continuous repetition of a movement with movement parameters incremented progressively until a limit of available torque is reached, or until a precision constraint set by the user is exceeded. The movement parameter is a characteristic data element of the movement program, indicating, for example, the acceleration and/or the velocity of an elementary movement of the robot 12, where "elementary movement" denotes the movement of each moving member of the robot 12 which contributes to the overall movement of an operating head of the robot.

The autotuning supervisor 14 executes, in an automatic way, successive attempts to increment the accelerations and the velocities of the elementary movements of the robot, and checks, by means of the system monitor 18, the precision of the resulting movement of the robot and the load state of the individual motors which contribute to the resulting movement. If the load condition of the motors (represented by the delivered torque, for example) remains below a critical threshold and if the precision of movement is contained within the limit set by the user, in the next step the autotuning supervisor 14 modifies the movement program by increasing the movement parameter concerned (for example, acceleration and/or velocity) and repeats the movement program with this new parameter. The procedure is repeated until a limit value of the load state and/or of the precision of movement is reached.

Figure 1:
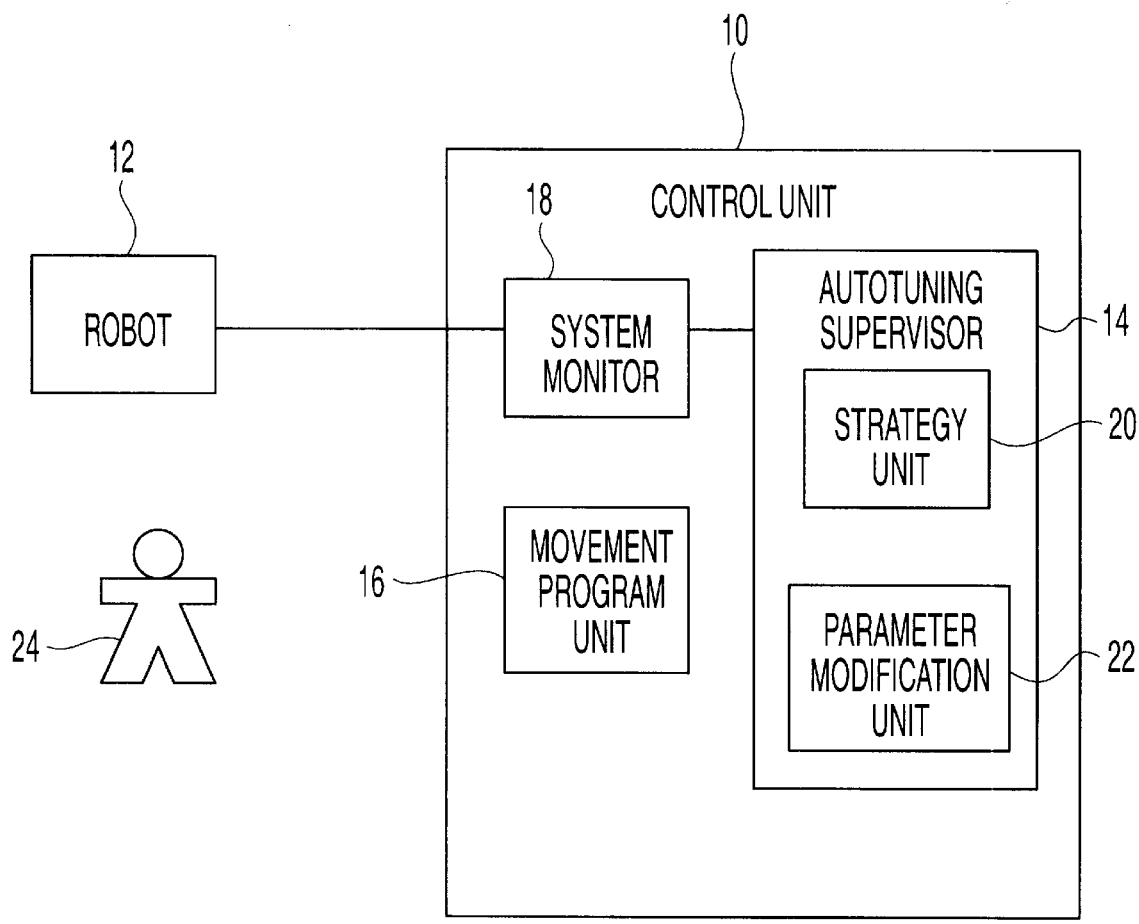
FIG. 1 is a block diagram illustrating the control structure of a robot designed to implement a process according to the present invention.
Figure 2:
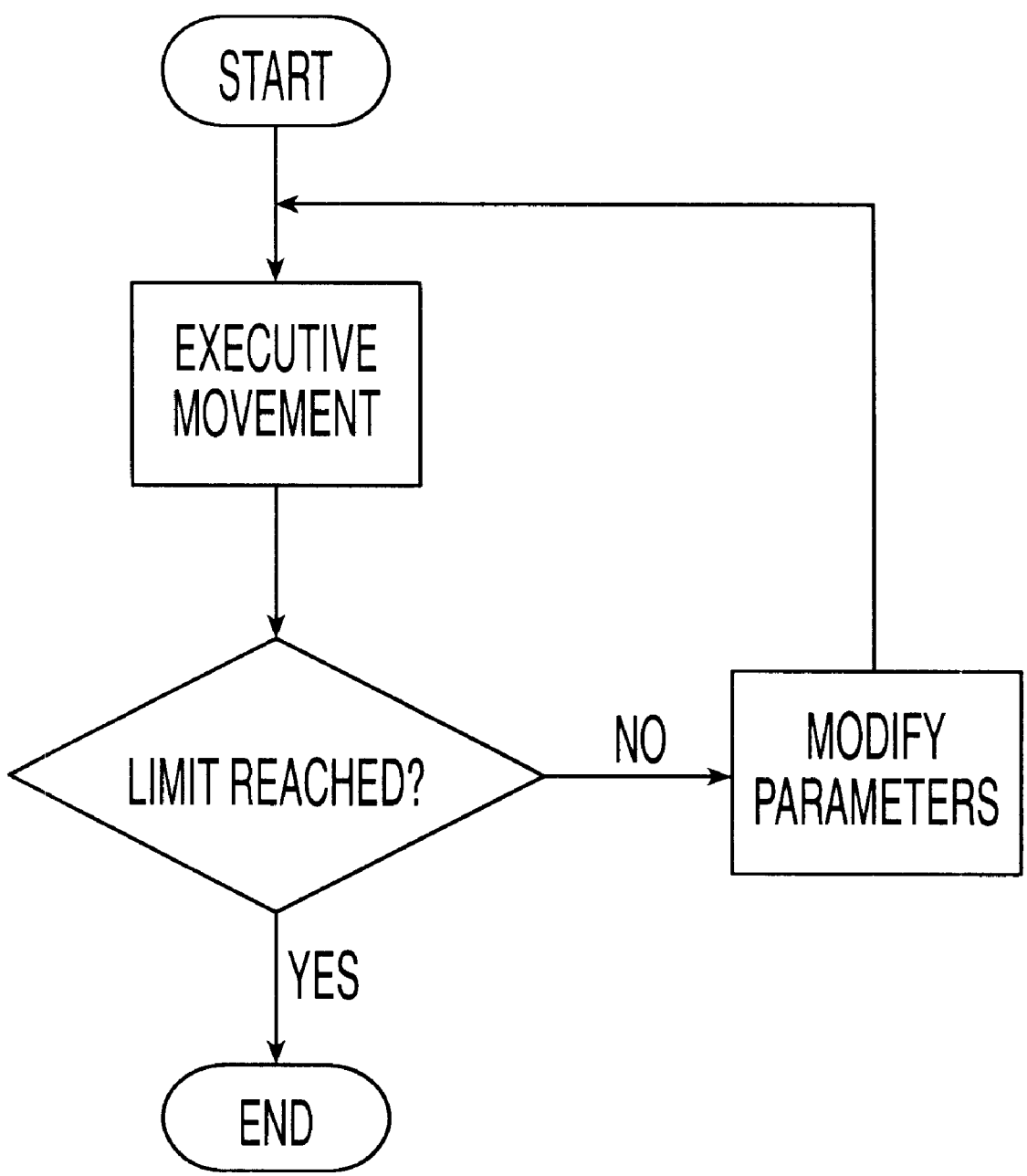
FIG. 2 is a diagram illustrating the sequence of operations of the process according to the invention.

This procedure is shown schematically in the diagram in FIG. 2, where the start step represents the moment at which the autotuning supervisor 14 reads the user's requests relating to the precision constraints. The step of execution of the movement is the part of the procedure during which the robot 14 executes a predetermined movement program with an initial movement parameter. In the next step, the autotuning supervisor 14 checks whether a motor load limit and a limit of precision of the resulting movement of the robot 12 has been reached. If none of these limits has been reached, the autotuning supervisor 14 automatically modifies the movement parameter and commands the execution of the same movement program again. The autotuning procedure terminates when a limit of the load state and/or precision of movement is exceeded. The numerical control unit 10 stores as the optimal movement program the last movement program which has been executed without exceeding the limit values of load and/or precision.

What is claimed is:

1. Process for the automatic determination of an optimal movement program of a robot comprising at least one moving member, motor means associated with said moving member and control means for activating said motor means according to a movement program to move said moving member along a trajectory with a predetermined movement parameter, the process comprising the steps of:

acquiring data indicating a load state of said motor means and precision of movement of the robot during execution of the movement program, comparing information on the load state and on the precision of movement with predetermined limit values, repeatedly executing the movement program while progressively varying the said movement parameter until a measured value of the load state and/or of the precision of movement exceeds a corresponding limit value, and storing as the optimal movement program a last movement program which has been executed without exceeding the said limit values.

2. System for the automatic determination of an optimal movement program of a robot comprising at least one moving member, motor means associated with said moving member and control means for activating said motor means according to a movement program to move said moving member along a trajectory with a predetermined movement parameter, the system comprising means of acquiring data indicating a load state of said motor means and precision of movement of the robot during execution of a movement program, means for comparing information on the load state and on the precision of movement with predetermined limit values, programmed control means for repeatedly executing the movement program while progressively varying said movement parameter until a measured value of the load state and/or of the precision of movement exceeds a corresponding limit value, and means for storing as the optimal movement program a last movement program which has been executed without exceeding said limit values.

* * * * *